United States Patent
Wang

(10) Patent No.: US 10,030,800 B2
(45) Date of Patent: Jul. 24, 2018

(54) PUSH-TO-PRESS INFLATION ADAPTOR FOR ENGLISH VALVES

(71) Applicant: BETO ENGINEERING AND MARKETING CO., LTD., Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 201 days.

(21) Appl. No.: 15/227,972

(22) Filed: Aug. 4, 2016

(65) Prior Publication Data

US 2018/0038538 A1    Feb. 8, 2018

(51) Int. Cl.
*F16L 29/02*    (2006.01)
*F16L 37/38*    (2006.01)
(Continued)

(52) U.S. Cl.
CPC ............ *F16L 37/32* (2013.01); *B60C 29/064* (2013.01); *F16L 29/02* (2013.01); *F16L 37/12* (2013.01);
(Continued)

(58) Field of Classification Search
CPC ...... F16K 15/142; F16K 15/145; F16K 15/20; F16K 15/202; F16K 21/02; F16L 21/00; F16L 21/02; F16L 29/02; F16L 31/00; F16L 37/00; F16L 37/1225; F16L 37/26; F16L 37/38; F16L 37/12; F16L 37/32; F16L 27/0812; F16L 27/0816; F16L 27/082; B60C 29/06; B60C 29/064; B60S 5/04; F04B 33/00; F04B 33/005; Y10T 137/3584; Y10T 137/3724; Y10T 137/784
(Continued)

(56) References Cited

U.S. PATENT DOCUMENTS 4,076,278 A * 2/1978 Chateau ................ F16L 37/002
  285/18
4,422,472 A * 12/1983 Klein ...................... F16L 37/26
  137/614.06
(Continued)

FOREIGN PATENT DOCUMENTS

DE    102012105914 B4 *  8/2015   ............ F04B 33/005

*Primary Examiner* — Reinaldo Sanchez-Medina
*Assistant Examiner* — Hailey K Do
(74) *Attorney, Agent, or Firm* — Leong C. Lei

(57) ABSTRACT

A push-to-press inflation adaptor is provided for use with an English valve and includes a valve connector, a connection barrel, a coupler, an air tube, and a spring. The valve connector includes a first movement hole, a positioning cavity, a communication compartment, a valve opening and a constraint opening. The connection barrel is coupled to the valve connector. The connection barrel includes a second movement hole and an air tube opening. The coupler is received in the first movement hole and the second movement hole of the valve connector and the connection barrel and is reciprocally movable through application of a force thereto. The air tube is received through the air tube opening into the connection barrel to be jointed to the coupler. The spring is supported between the coupler and the connection barrel to provide a preloading force to bias the coupler in a direction toward the constraint opening.

8 Claims, 8 Drawing Sheets

(51) Int. Cl.
*B60C 29/06* (2006.01)
*F16K 15/20* (2006.01)
*F16L 37/32* (2006.01)
*F16L 37/12* (2006.01)

(52) U.S. Cl.
CPC .............. *F16L 37/38* (2013.01); *F16K 15/20* (2013.01); *Y10T 137/3584* (2015.04); *Y10T 137/3724* (2015.04)

(58) Field of Classification Search
USPC ........................................ 251/142, 150, 148
See application file for complete search history.

(56) References Cited

U.S. PATENT DOCUMENTS

| | | | | |
|---|---|---|---|---|
| 5,607,250 A | * | 3/1997 | Tatterson | E21B 17/046 166/377 |
| 6,059,325 A | * | 5/2000 | Heckele | A61M 39/10 285/261 |

* cited by examiner

PUSH-TO-PRESS INFLATION ADAPTOR FOR ENGLISH VALVES

TECHNICAL FIELD OF THE INVENTION

The present invention relates generally to an inflation adaptor for English valves, and more particularly to a push-to-press inflation adaptor for English valves.

DESCRIPTION OF THE PRIOR ART

Bicycle tire valves can be available for various types, generally classified as American (Schrader) valves, French (Presta) valves, and English valves, each being of specific advantages and disadvantages. All these types of bicycle tire valves have been used in different areas and groups.

However, for inflation with an English valve, a specific inflation adaptor that is dedicated for the English valve must be used. The commonly used adaptors for English valves have a very complicated structure, which leads to an increased manufacture cost, and requires a complicated and difficult operation process.

SUMMARY OF THE INVENTION

In view of the above problem, to overcome the drawbacks of the conventional inflation adaptors for English valves that the structure is complicated, the manufacturing cost is high, and the operation is difficult, the present invention aims to provide a push-to-press inflation adaptor for English valves, which generally comprises a valve connector, which has an end in which a first movement hole is formed and extends inwardly in an axial direction, the valve connector having a side surface that is inwardly recessed to form a positioning cavity and a communication compartment extending from outside to inside, the positioning cavity and the communication compartment being in communication with each other, the valve connector having an opposite end in which a valve opening is formed and extends inwardly in the axial direction, the valve opening being in communication with the positioning cavity, the communication compartment and the first movement hole comprising therebetween a constraint opening for communication therebetween, the constraint opening having an opening size that is smaller than a diameter of the first movement hole; a connection barrel, which is coupled to the valve connector, the connection barrel comprising a second movement hole formed therein and extending in the axial direction therethrough, the second movement hole being in communication with the first movement hole, the connection barrel having an end in which an air tube opening is formed and extends inwardly in the axial direction to communicate with the second movement hole, the air tube opening having an opening size that is smaller than a diameter of the second movement hole; a coupler, which is received in the first movement hole and the second movement hole of the valve connector and the connection barrel and is reciprocally movable through application of an external force thereto; an air tube, which is received through the air tube opening of the connection barrel to extend to and be jointed to the coupler; and a spring, which is supported between the coupler and the connection barrel to provide a preloading force for biasing the coupler to move in a direction toward the constraint opening. With such an arrangement, the present invention provides advantages including simple structure, low production cost, and easy operation.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
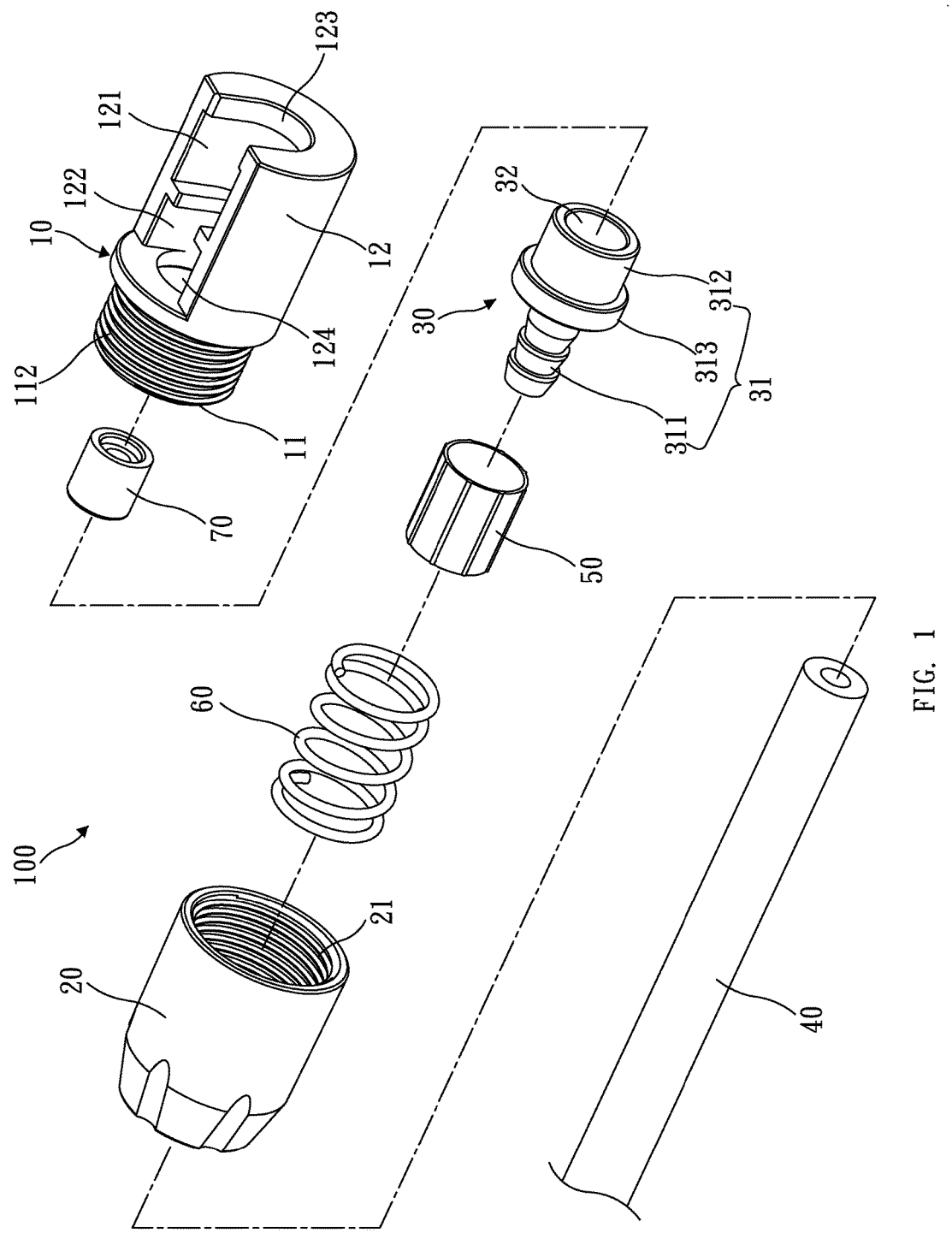
FIG. 1 is an exploded view showing a preferred embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-7, a push-to-press inflation adaptor according to a preferred embodiment, generally designated at 100, is provided for use with an English valve and generally comprises a valve connector 10, a connection barrel 20, a coupler 30, an air tube 40, a clamp sleeve 50, a spring 60, and a flexible pressing ring 70.

Figure 2:
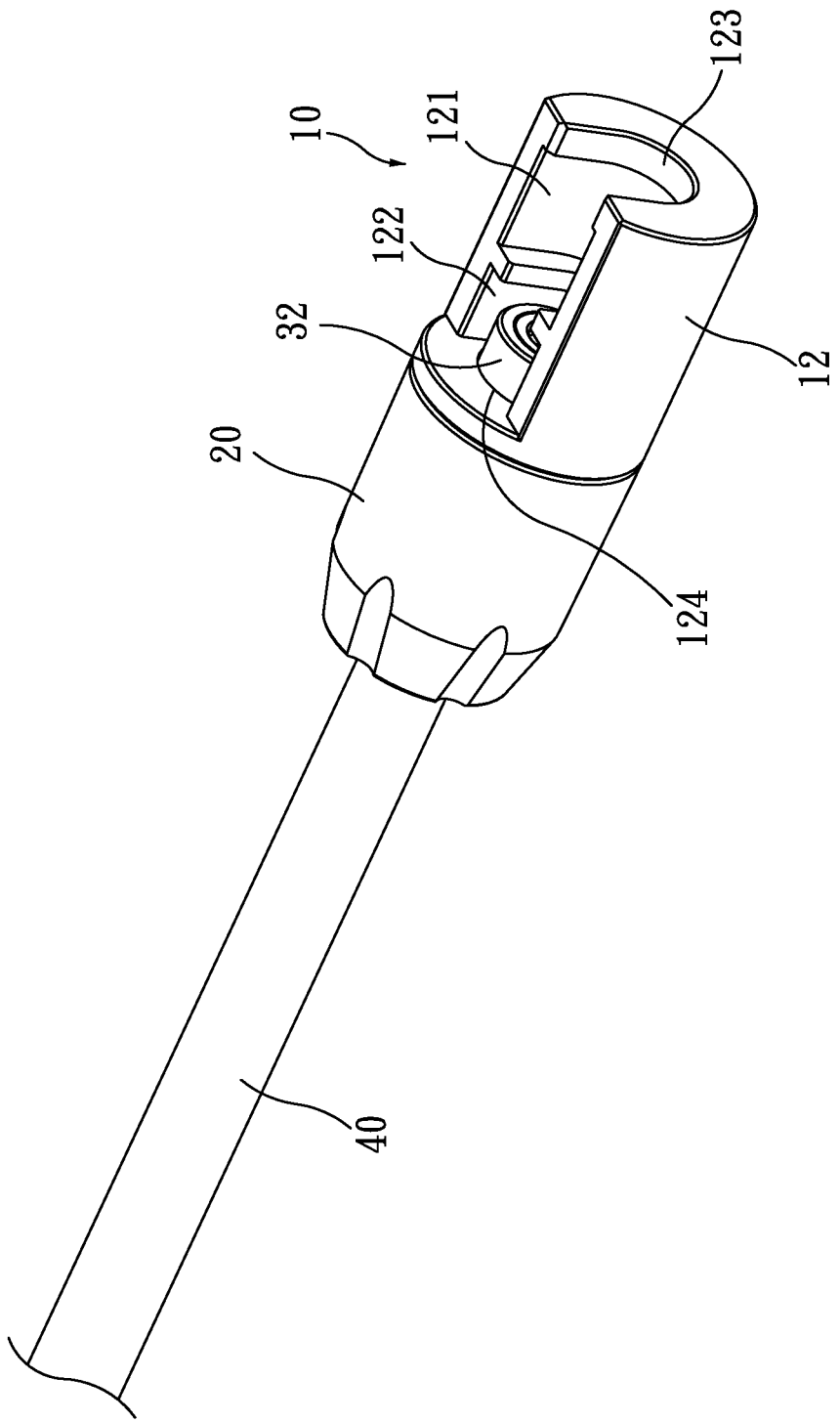
FIG. 2 is a perspective view showing the embodiment of FIG. 1 in an assembled condition.
Figure 3:
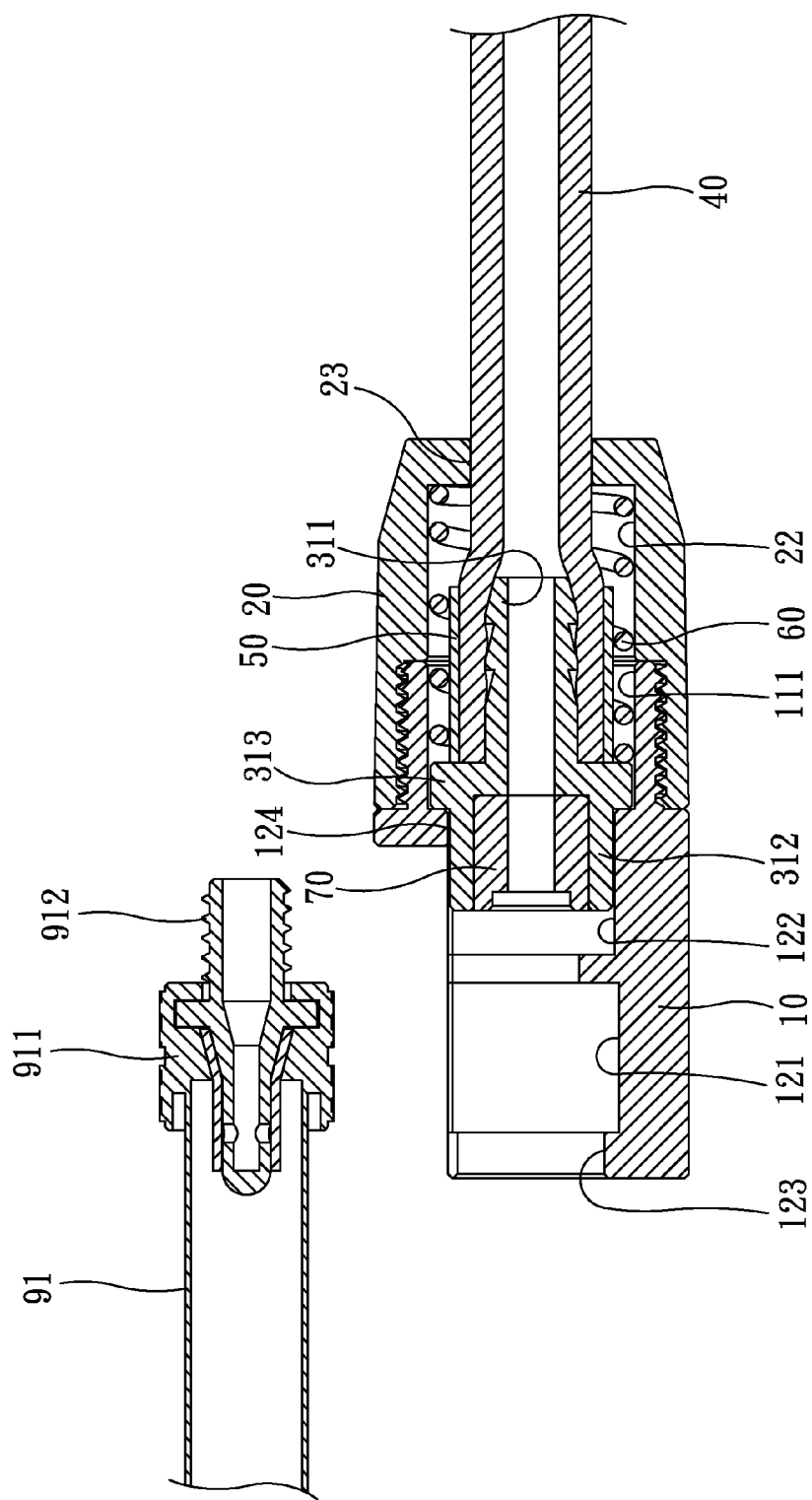
FIG. 3 is a cross-sectional view showing the embodiment of FIG. 1 in the assembled condition.

Referring to FIGS. 1-3, the valve connector 10 comprises a threading connection section 11 and a positioning section 12 that is coaxial with and integrally connected with the threading connection section 11. The threading connection section 11 comprises a first movement hole 111 formed in a free end thereof and extending inwardly in an axial direction. The threading connection section 11 comprises an external thread 112 formed on an external circumferential surface thereof. The positioning section 12 comprises a positioning cavity 121 and a communication compartment 122 that are formed in a side surface thereof and are inwardly recessed and extend in a direction from outside to inside. The positioning cavity 121 and the communication compartment 122 are in communication with each other. The positioning section 12 comprises a valve opening 123 formed in a free end thereof and extending inwardly in the axial direction. The valve opening 123 is in communication with the positioning cavity 121. The communication compartment 122 and the first movement hole 111 comprise therebetween a constraint opening 124 for communication therebetween. The constraint opening 124 has an opening size that is smaller than a diameter of the first movement hole 111.

Referring to FIGS. 1-3, the connection barrel 20 has an end comprising an internal thread 21 formed therein. The internal thread 21 is engageable with the external thread 112 of the valve connector 10. The connection barrel 20 comprises a second movement hole 22 formed therein and extending in the axial direction therethrough. The second movement hole 22 is in communication with the first movement hole 111. The connection barrel 20 has an opposite end that comprises an air tube opening 23 formed therein and extending inwardly in the axial direction to communicate with the second movement hole 22. The air tube opening 23 has an opening size that is smaller than a diameter of the second movement hole 22.

Referring to FIGS. 1-3, the coupler 30 comprises a coupler body 31 and an air charging hole 32 extending, in the axial direction, through the coupler body 31. The coupler body 31 has an outer circumferential surface that comprises a tube connection section 311, a valve connection section 312 and a constraint section 313 arranged between and connecting between the tube connection section 311 and the valve connection section 312. The constraint section 313 has an outside diameter that is greater than outside diameters of the tube connection section 311 and the valve connection section 312. The coupler 30 is received in the first movement hole 111 and the second movement hole 22 of the valve connector 10 and the connection barrel 20 and is reciprocally movable through application of an external force thereto. Further, the tube connection section 311 is arranged to face the air tube opening 23, and the valve connection section 312 faces toward the constraint opening 124.

Referring to FIGS. 1-3, the air tube 40 has an end that is received through the air tube opening 23 of the connection barrel 20 to extend therein to be fit to and jointed to the tube connection section 311 of the coupler 30. The air tube 40 has an opposite end that is connectable to an air pump or air storage canister (not shown).

Referring to FIGS. 1-3, the clamp sleeve 50 is provided for tightly clamping and fixing the air tube 40 on the tube connection section 311 of the coupler 30 to prevent separation of the air tube 40 and the coupler 30 from each other.

Referring to FIGS. 1-3, the spring 60 is positioned between and abuts against the constraint section 313 of the coupler 30 and an inside wall of the air tube opening 23 of the connection barrel to provide a preloading force for biasing the coupler 30 to move in a direction toward the constraint opening 124.

Referring to FIGS. 1-3, the flexible pressing ring 70 is deformable through application of an external force and is arranged inside the valve connection section 312 of the coupler 30.

Thus, the above provides a description of components of a push-to-press inflation adaptor 100 for English valves according to a preferred embodiment of the present invention, and the assembly thereof In the following, an operation and use will be described.

Figure 4:
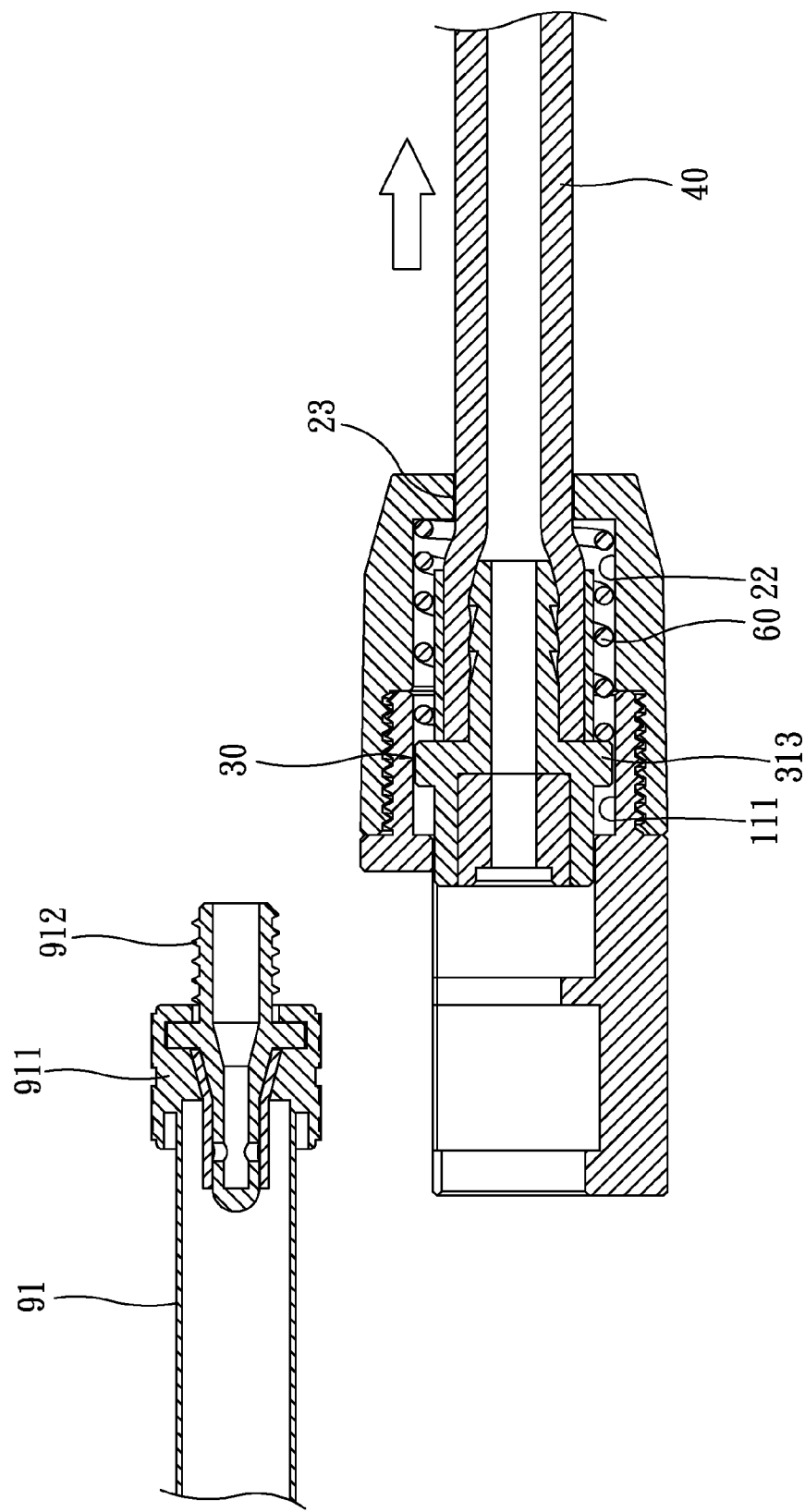
FIGS. 4-7 are schematic views demonstrating an operation of the embodiment shown in FIG. 1.
Figure 5:
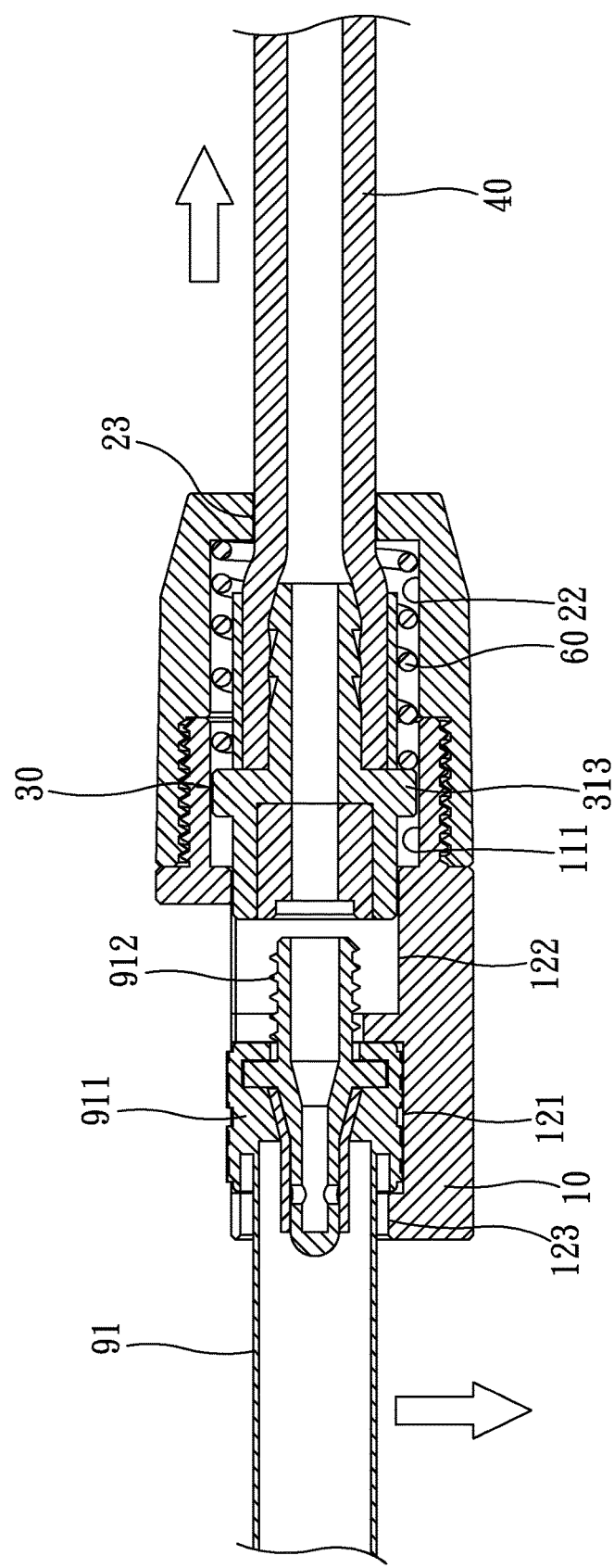
Figure 6:
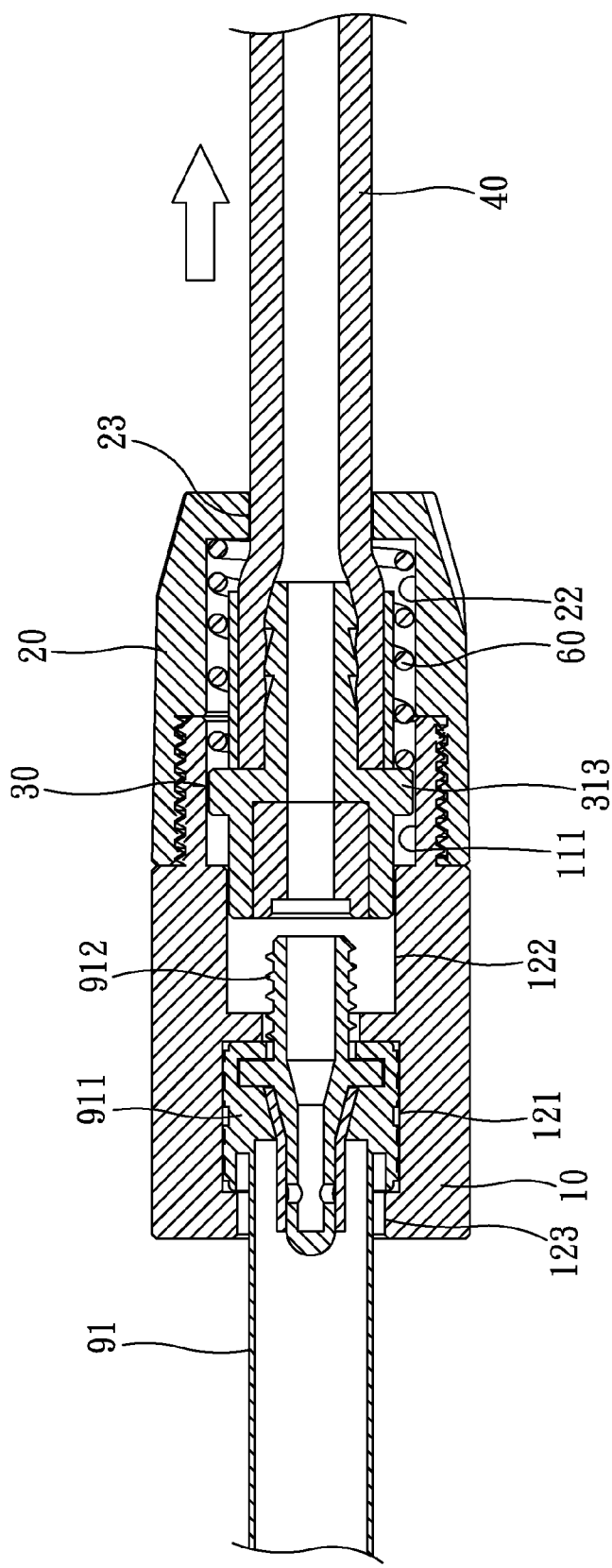
Figure 7:
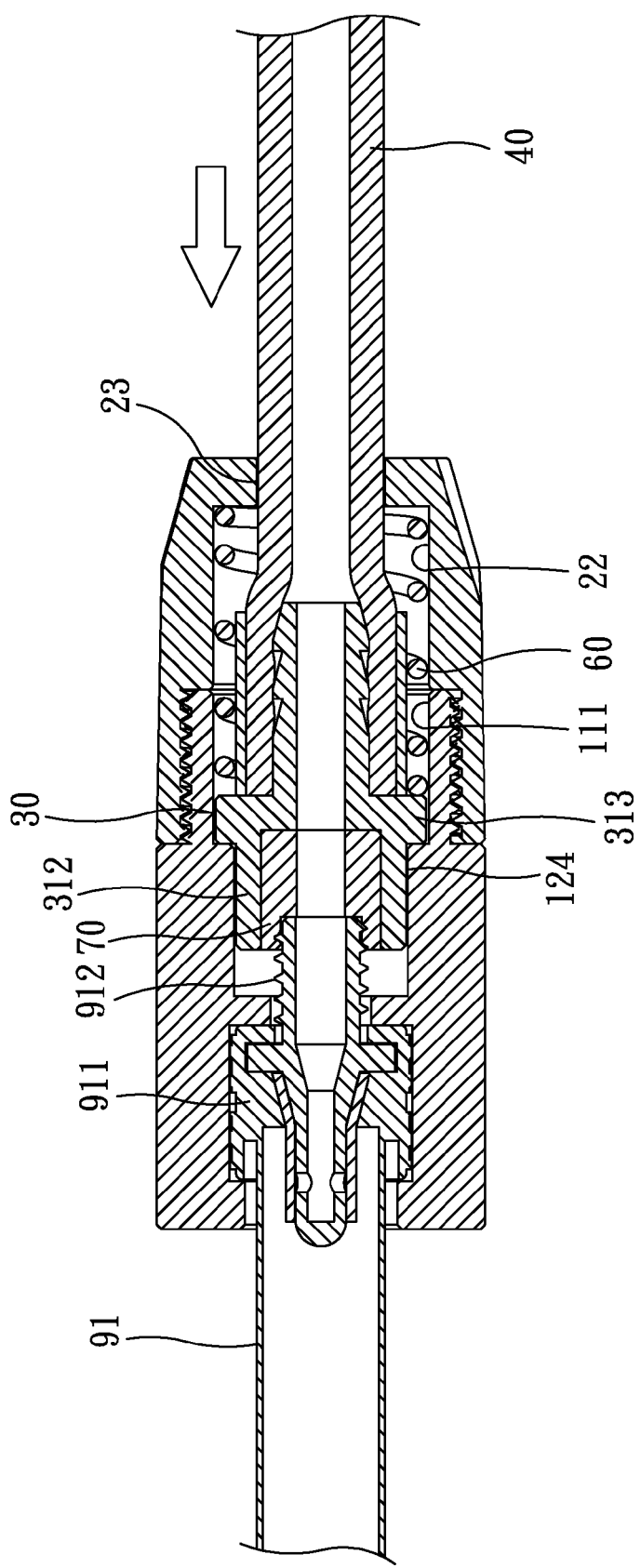

In an attempt for charging air to an English valve 91 (as shown in FIG. 3), the air tube 40 is firstly pulled such that the coupler 30 compress the spring 60 and moves in a direction toward the air tube opening 23 (as shown in FIG. 4). Next, a nut 911 of the English valve 91 is positioned into the positioning cavity 121 of the valve connector 10 such that an air charging end 912 of the English valve 91 is set in the communication compartment 122 (as shown in FIGS. 5 and 6). The air tube 40 is then released to allow the coupler 30 pushed by the spring force of the spring 60 to move in a direction toward the constraint opening 124 so that the flexible pressing ring 70 that is located inside the valve connection section 312 of the coupler 30 is caused to press against the air charging end 912 of the English valve 91 (as shown in FIG. 7). As such, air or gas that is supplied from an air pump or an air storage canister can be fed through the air tube 40 into the English valve 91 to realize charging air into the English valve 91.

Thus, the present invention involves a positioning cavity 121 and a communication compartment 122 so formed that an English valve 91 is positionable into the valve connector 10 by way of the positioning cavity 121 and the communication compartment 122 and coupling between the present invention and the English valve can be achieved through an operation of pulling and pushing so that the operation is made easy. Further, the present invention involves a simple structure so that the cost can be greatly reduced.

Figure 8:
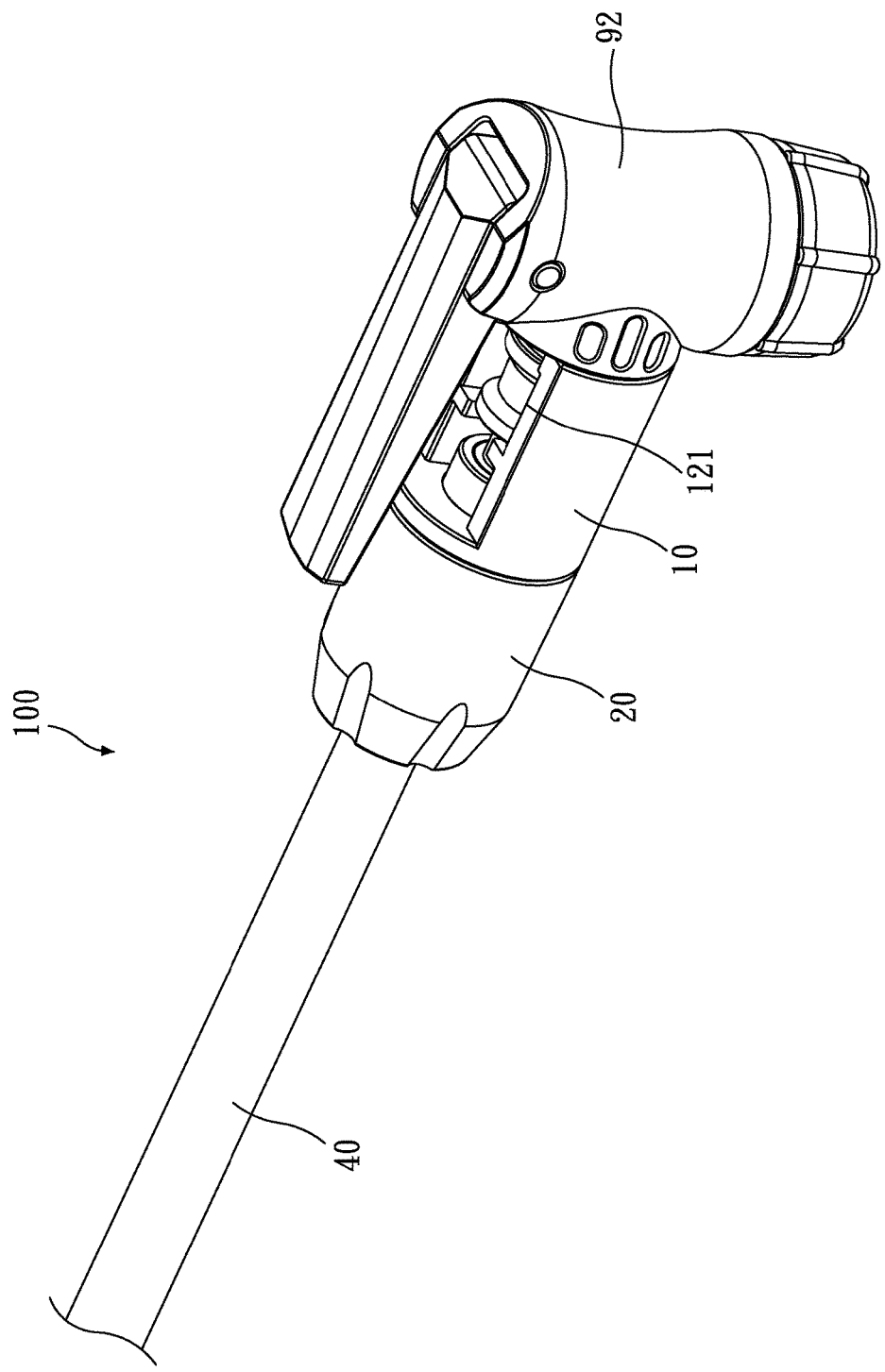
FIG. 8 is a perspective view illustrating another embodiment of the present invention.

In addition, as shown in FIG. 8, besides being capable of receiving an English valve to be disposed therein, the positioning cavity 121 may receive and connect with an American/French dual purpose adaptor 92 therein so that in addition to directly charging air to an English valve, through the American/French dual purpose adaptor, the present invention is applicable to charging air to an American valve or a French valve, thereby expanding the adaptability of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A push-to-press inflation adaptor for use with an English valve, comprising:
   a valve connector, which has an end in which a first movement hole is formed and extends inwardly in an axial direction, the valve connector having a side surface that is inwardly recessed to form a positioning cavity and a communication compartment extending from outside to inside, the positioning cavity and the communication compartment being in communication with each other, the valve connector having an opposite end in which a valve opening is formed and extends inwardly in the axial direction, the valve opening being in communication with the positioning cavity, the communication compartment and the first movement hole comprising therebetween a constraint opening for communication therebetween, the constraint opening having an opening size that is smaller than a diameter of the first movement hole;
   a connection barrel, which is coupled to the valve connector, the connection barrel comprising a second movement hole formed therein and extending in the axial direction therethrough, the second movement hole being in communication with the first movement hole, the connection barrel having an end in which an air tube opening is formed and extends inwardly in the axial direction to communicate with the second movement hole, the air tube opening having an opening size that is smaller than a diameter of the second movement hole;

a coupler, which is received in the first movement hole and the second movement hole of the valve connector and the connection barrel and is reciprocally movable through application of an external force thereto;

an air tube, which is received through the air tube opening of the connection barrel to extend to and be jointed to the coupler; and a spring, which is supported between the coupler and the connection barrel to provide a preloading force for biasing the coupler to move in a direction toward the constraint opening.

2. The push-to-press inflation adaptor according to claim 1, wherein the valve connector comprises a threading connection section and a positioning section that is coaxial with and integrally connected with the threading connection section, the first movement hole being formed in a free end of the threading connection section and extending inwardly in the axial direction, the threading connection section having an external circumferential surface on which an external thread is formed, the positioning cavity and the communication compartment being formed by recessing a side surface of the positioning section to extend in a direction from outside to inside, the valve opening being formed in a free end of the positioning section and extending inwardly in the axial direction, the connection barrel having an opposite end in which an internal thread is formed, the internal thread being engageable with the external thread of the valve connector.

3. The push-to-press inflation adaptor according to claim 1 further comprising a clamp sleeve that securely clamps and fixes the air tube on the coupler.

4. The push-to-press inflation adaptor according to claim 1, wherein the positioning cavity of the valve connector is for receiving an English valve therein.

5. The push-to-press inflation adaptor according to claim 1, wherein the positioning cavity of the valve connector receives an American/French dual-purpose adaptor to be disposed therein.

6. The push-to-press inflation adaptor according to claim 1, wherein the coupler comprises a coupler body and an air charging hole extending, in the axial direction, through the coupler body, the coupler body having an outer circumferential surface that comprises a tube connection section, a valve connection section, and a constraint section arranged between and connecting between the tube connection section and the valve connection section, the constraint section having an outside diameter that is greater than outside diameters of the tube connection section and the valve connection section, the constraint section being received in the first movement hole and the second movement hole of the valve connector and the connection barrel, the tube connection section facing toward the air tube opening and connected to the air tube, the valve connection section facing toward the constraint opening.

7. The push-to-press inflation adaptor according to claim 6, wherein the spring is supported between the constraint section of the coupler and an inside wall of the air tube opening of the connection barrel.

8. The push-to-press inflation adaptor according to claim 6 further comprising a flexible pressing ring, which is received and retained in the valve connection section of the coupler.

* * * * *